UNITED STATES PATENT OFFICE.

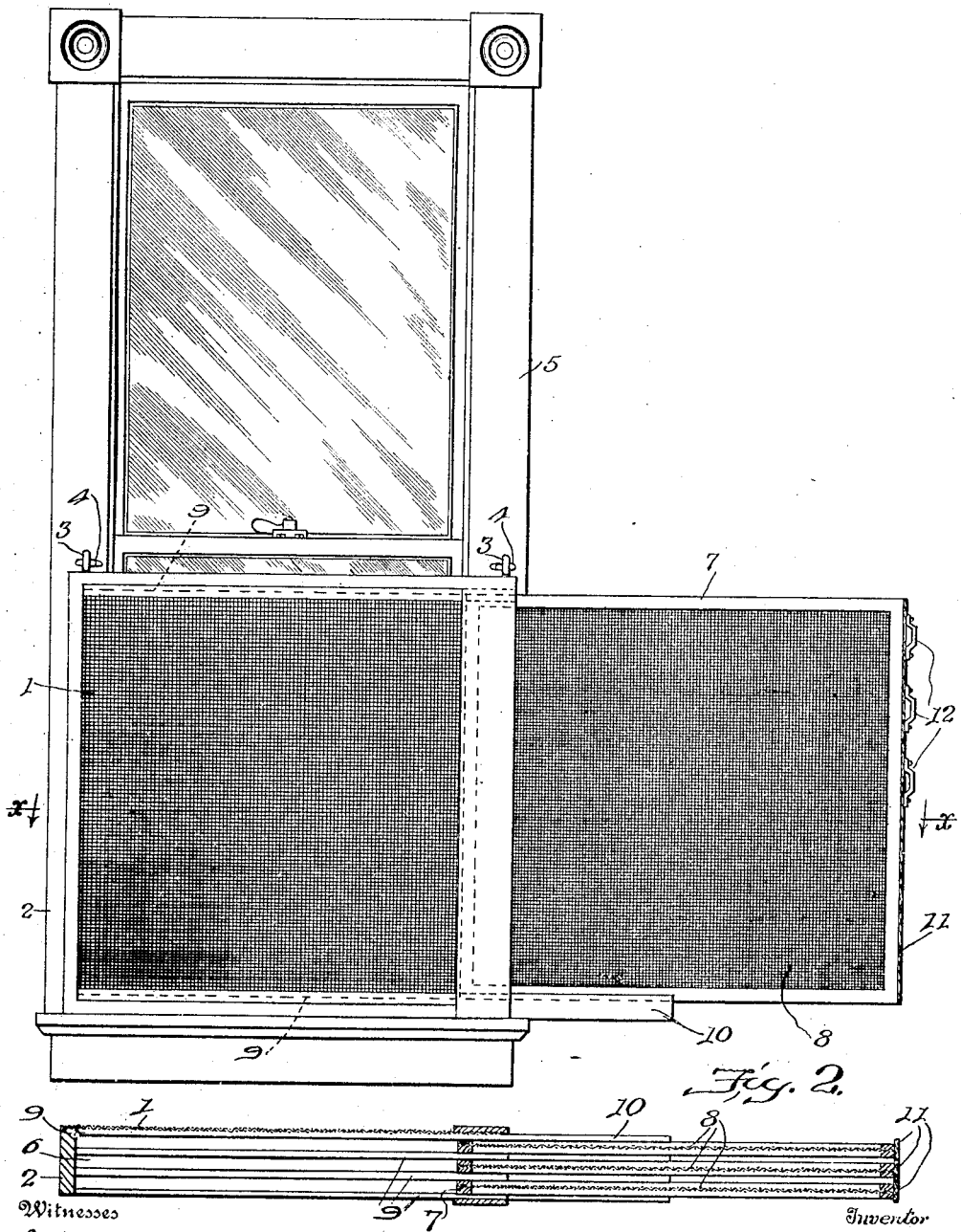

WILLIAM D. FULLER, OF SPRINGFIELD, OHIO.

FLY-TRAP.

No. 882,631.    Specification of Letters Patent.    Patented March 24, 1908.

Application filed June 7, 1907. Serial No. 377,672.

*To all whom it may concern:*

Be it known that I, WILLIAM D. FULLER, a citizen of the United States, residing at Springfield, in the county of Clark and State of Ohio, have invented certain new and useful Improvements in Fly-Traps, of which the following is a specification, reference being had therein to the accompanying drawings.

The present invention relates to fly traps, and the object of the same is to provide a trap which can be secured to a window or the like in open position and readily closed to entrap the flies within the same; and further, to provide such a trap with a receptacle having a plurality of closures adapted to be closed successively to divide the same into a series of pockets, whereby a number of catches may be made without removing the trap as a whole from the window.

With these objects in view my invention consists in certain novel features of construction and in certain parts and combinations hereinafter to be described, and then more particularly pointed out in the claims.

In the accompanying drawings, Figure 1 is a front elevation of my invention in its open position; and Fig. 2 is a transverse sectional view, taken on the line *x x* of Fig. 1 and looking in the direction of the arrows.

In these drawings, I have illustrated one form of my invention, which consists of a screen adapted to be secured in a fixed position in the frame of a window and provided with one or more movable screens adapted to be moved into position in front of said fixed screen and in such relation thereto as to form a receptacle between the adjacent screens and thus entrap the flies which have gathered on the fixed screen. The several screens may be of any suitable construction and may be operated in any suitable manner, but I prefer the form herein shown, in which the fixed screen 1 is secured to one side, preferably the rear, of the frame 2, which is preferably rectangular in shape and of any suitable size. This frame may be secured in position in front of the window in any suitable manner, such as by means of the hooks 3 secured to the frame and the screw-eyes 4 which are secured to the window casing 5. The frame 2 is provided with a series of guideways 6, in each of which is slidably mounted a frame 7, to which is secured a suitable screen 8. The ribs 9 which form the several guideways are of such thickness as to hold the frame 7 a sufficient distance from the fixed screen 1 to permit the frame and the screen carried thereby to be moved into its innermost position without disturbing the flies which have gathered on the fixed screen. The successive sliding screens are separated in the same manner. A suitable support is provided for supporting the screens when the same are moved into their outermost position. This support is preferably in the form of an extension 10 to the lower member of the frame 2, which extends for a considerable distance beyond the frame and beneath the slidable screens, thus forming an adequate support therefor. The frame 2 serves to close the receptacle formed between the screens on three sides thereof and the fourth side, which is the side of the frame in which the slidable screens are moved, is closed by suitable means carried by the outer ends of the frames 7. This means is preferably a strip of fabric 11, such as suitable cloth, which is secured to the outer ends of the frames 7 and extends beyond the edge thereof a distance sufficient to close the space lying between the end of the frame 7 and the fixed screen 1 or the adjacent frame. Suitable means are provided for moving the sliding screens into and out of their closed position, which may consist of suitable handles 12.

The operation of the device is as follows: the frame 2 is secured to the window casing by means of the hooks 3 and eyes 4 and the sliding screens are drawn to their outermost positions. The room is then darkened, with the exception of so much of the one window as is covered by the fixed screen 1, and the flies are driven toward this screen, where they accumulate. When a sufficient number of flies have gathered on the fixed screen, the first sliding screen is moved quickly to its innermost position, thus entrapping the flies upon the fixed screen. The flies are then caused to gather on the outer side of the first sliding screen, which is now in a fixed position immediately in front of the fixed screen, and the operation is repeated. If desired, several sliding screens may be used in a single room, thus making several catches without removing the screen from its position, or the screen may be moved from one room to the other and the catches made in different rooms. After the flies have been entrapped, the screen may be removed and the flies destroyed in any suitable manner.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. A fly trap comprising a frame adapted to be secured to a window casing, a screen secured at its edges to said frame, guideways formed in said frame at a distance from said screen, and a second screen slidably mounted in said guideways and adapted to be moved in front of the first-mentioned screen.

2. A fly trap comprising a frame and a plurality of screens mounted therein at a distance one from the other, one or more of said screens being slidably mounted in said frame.

3. A fly trap comprising a frame, a screen secured to said frame, a plurality of guideways formed in said frame at a distance one from the other, and screens slidably mounted in said guideways and adapted to form receptacles when in their closed positions.

4. A fly trap comprising a frame, a screen secured thereto, and a second screen slidably mounted in said frame in front of the first-mentioned screen, and a support carried by said frame and extending beneath said slidable screen when the same is in its outermost position.

5. A fly trap comprising a frame, a plurality of screens mounted therein at a distance one from the other, one of said screens being slidably mounted, and flexible means for closing the space between the ends of said screens.

6. A fly trap comprising a receptacle, and a plurality of closures therefor adapted to be closed successively to form a series of pockets.

In testimony whereof, I affix my signature in presence of two witnesses.

WILLIAM D. FULLER.

Witnesses:
   E. O. HAGAN,
   GEO. A. FULLER.